United States Patent [19]
Miyano

[11] Patent Number: 5,703,724
[45] Date of Patent: Dec. 30, 1997

[54] OBJECTIVE LENS SYSTEM FOR ENDOSCOPE

[75] Inventor: Hitoshi Miyano, Saitama, Japan

[73] Assignees: Fuji Photo Film, Co., Ltd., Kanagawa; Fuji Photo Optical Co., Ltd, Saitama-ken, both of Japan

[21] Appl. No.: 653,599

[22] Filed: May 16, 1996

[30] Foreign Application Priority Data

May 16, 1995 [JP] Japan ................................. 7-117204

[51] Int. Cl.$^6$ .............................. G02B 21/02; G02B 3/00; G02B 9/00; G02B 9/34
[52] U.S. Cl. .................. 359/660; 359/644; 359/659; 359/737; 359/739; 359/783
[58] Field of Search ............................ 359/656–660, 359/643, 644, 737, 739, 783

[56] References Cited

U.S. PATENT DOCUMENTS

| | | | |
|---|---|---|---|
| 4,493,537 | 1/1985 | Nakahashi | 359/783 |
| 4,984,878 | 1/1991 | Miyano | 359/783 |
| 5,175,650 | 12/1992 | Takayama et al. | 359/644 |
| 5,198,931 | 3/1993 | Igarashi | 359/660 |
| 5,587,839 | 12/1996 | Miyano et al. | 359/660 |

FOREIGN PATENT DOCUMENTS 2-176611  7/1990  Japan.

*Primary Examiner*—David C. Nelms
*Assistant Examiner*—Evelyn A. Lester
*Attorney, Agent, or Firm*—Young & Thompson

[57] ABSTRACT

An objective lens system for an endoscope comprises from the subject end to the image end a meniscus lens element of negative optical power having a concave image side surface, a plano-convex lens element of positive optical power having a convex subject side surface, an aperture element, a plano-convex lens element of positive optical power having a convex image side surface and a biconvex lens element of positive optical power.

17 Claims, 13 Drawing Sheets

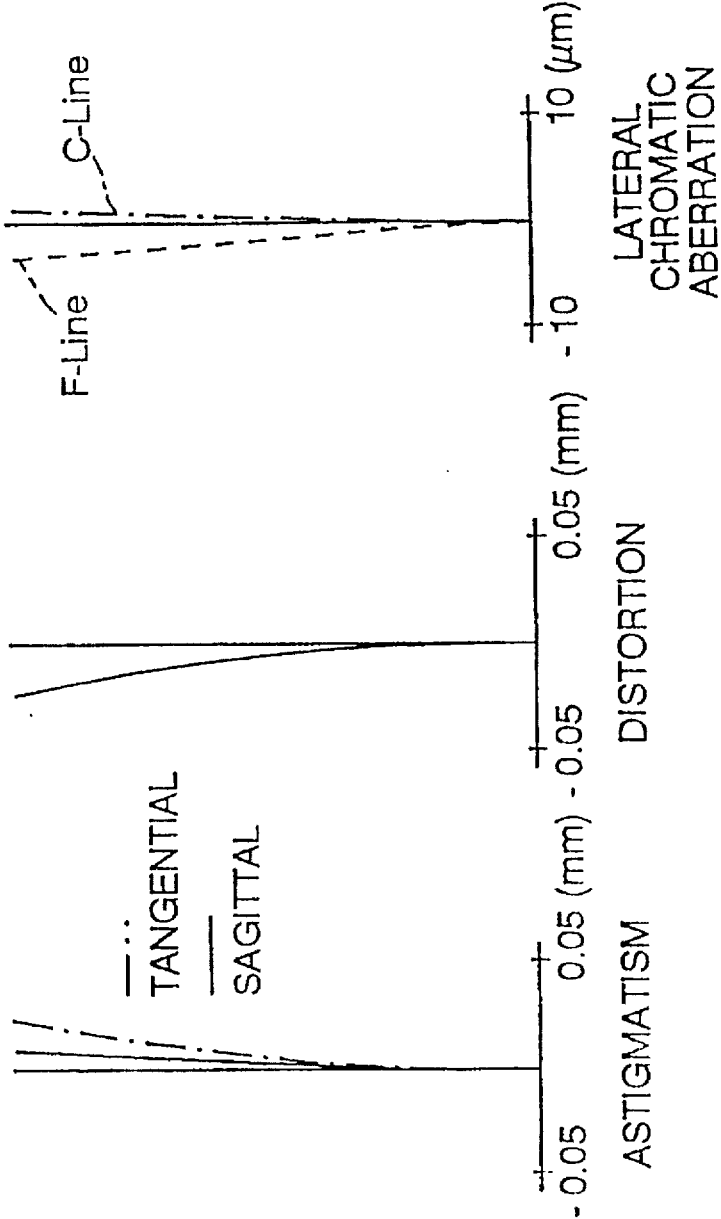

COMA
TANGENTIAL PLANE | SAGITTAL PLANE
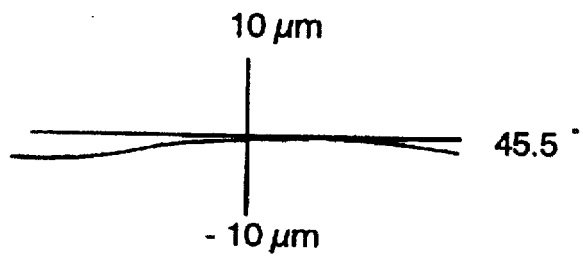
FIG. 3A — 45.5°
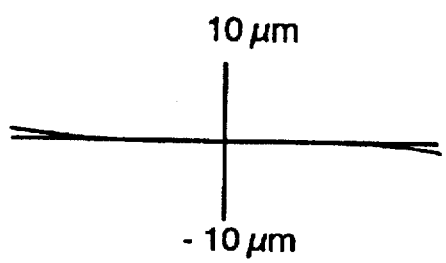
FIG. 3B
FIG. 3C — 35.8°
FIG. 3D
FIG. 3E — 26.5°
FIG. 3F
FIG. 3G — 0°

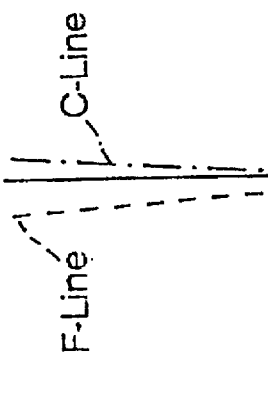
FIG. 5(A)
F = 5.60
SPHERICAL ABERRATION
FIG. 5(B)
58.7°
ASTIGMATISM
--- TANGENTIAL
—— SAGITTAL
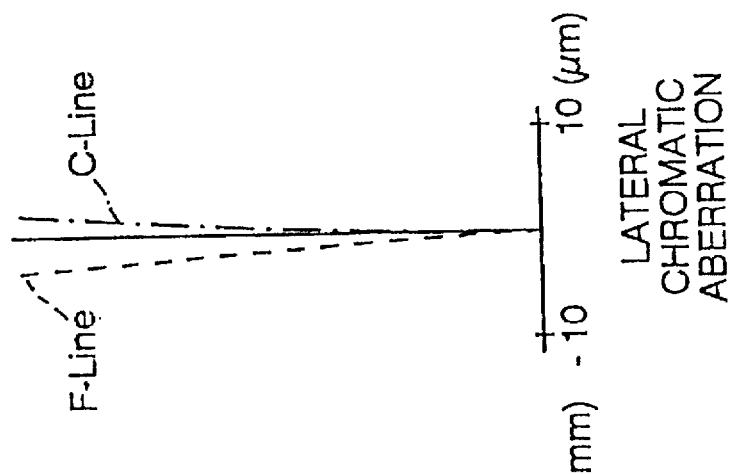
FIG. 5(C)
58.7°
DISTORTION
FIG. 5(D)
58.7°
LATERAL CHROMATIC ABERRATION

COMA
TANGENTIAL PLANE | SAGITTAL PLANE
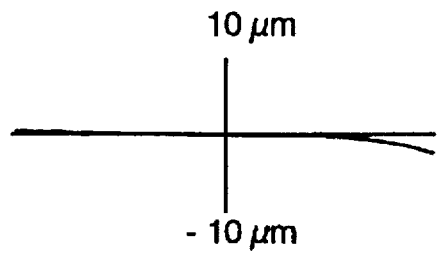
FIG. 6A — 58.7°
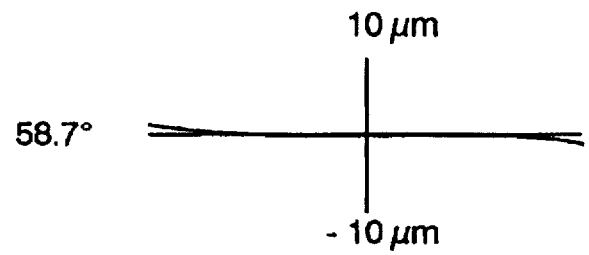
FIG. 6B
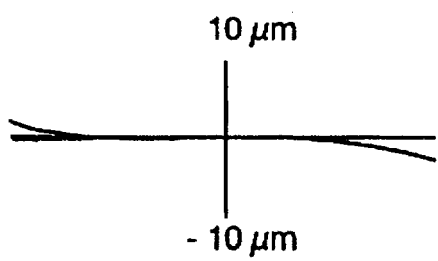
FIG. 6C — 44°
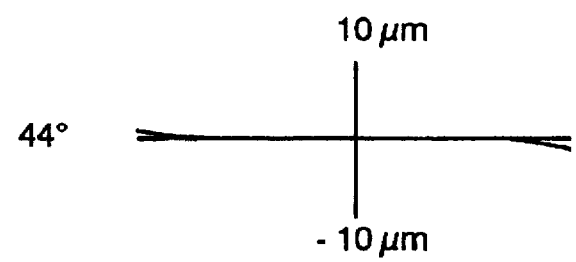
FIG. 6D
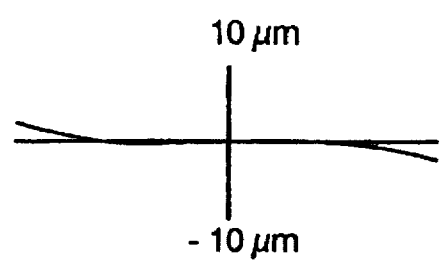
FIG. 6E — 31.8°
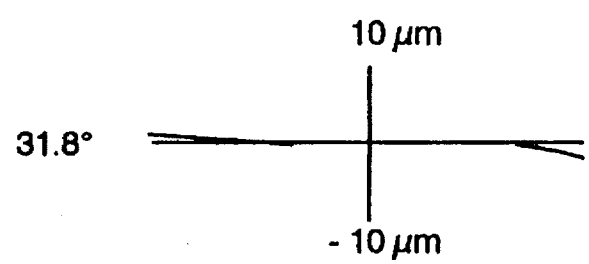
FIG. 6F
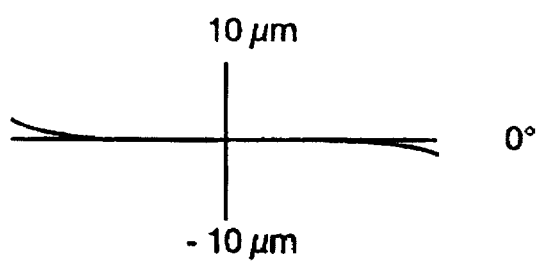
FIG. 6G — 0°

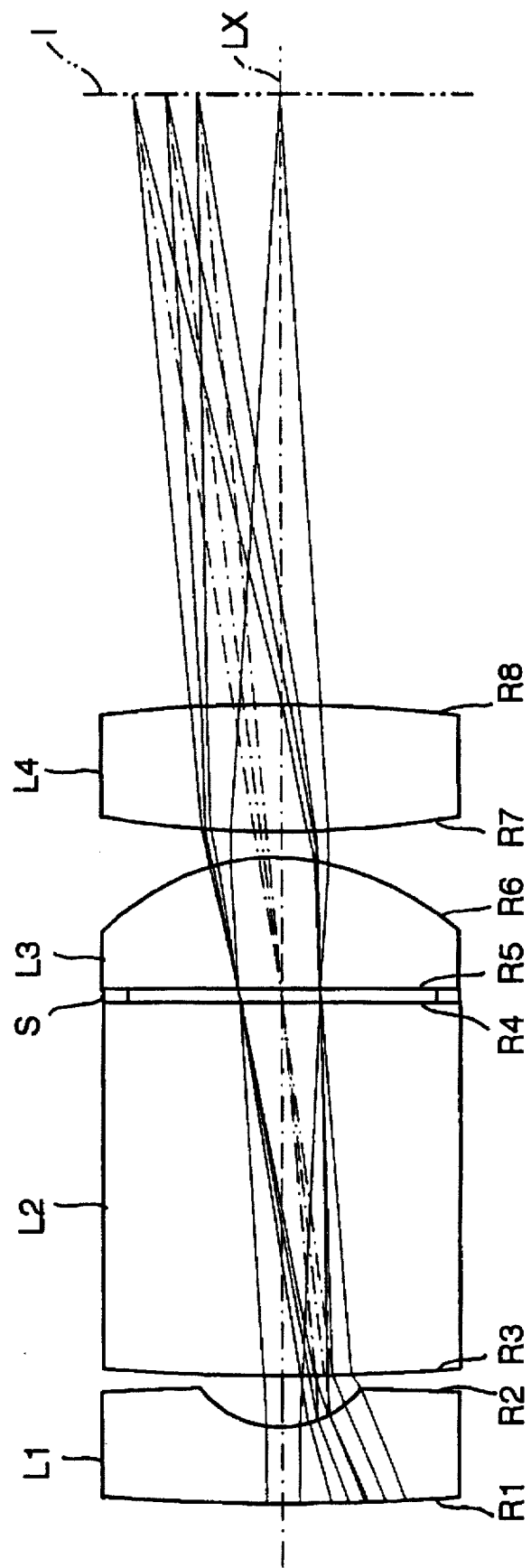

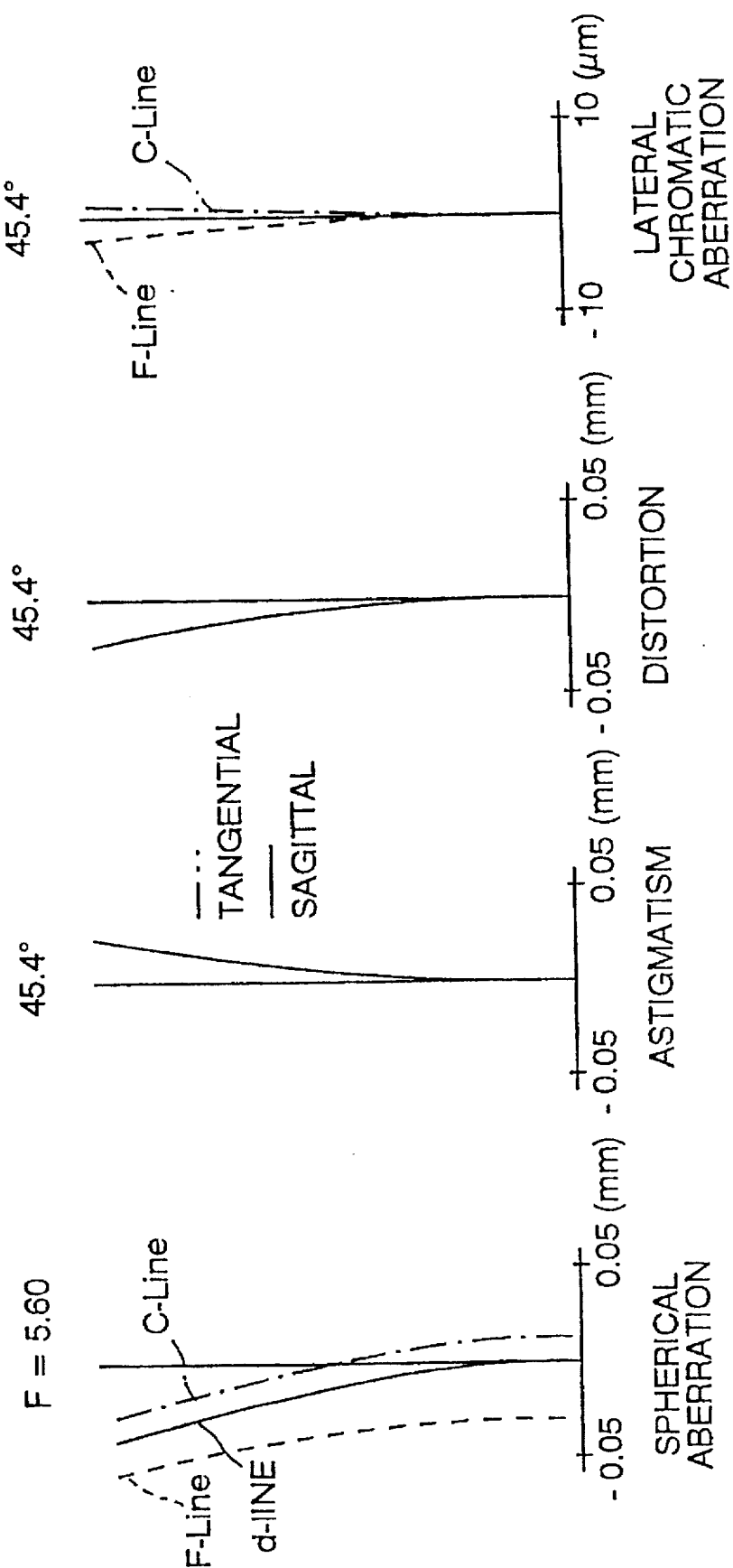

COMA

TANGENTIAL PLANE

SAGITTAL PLANE

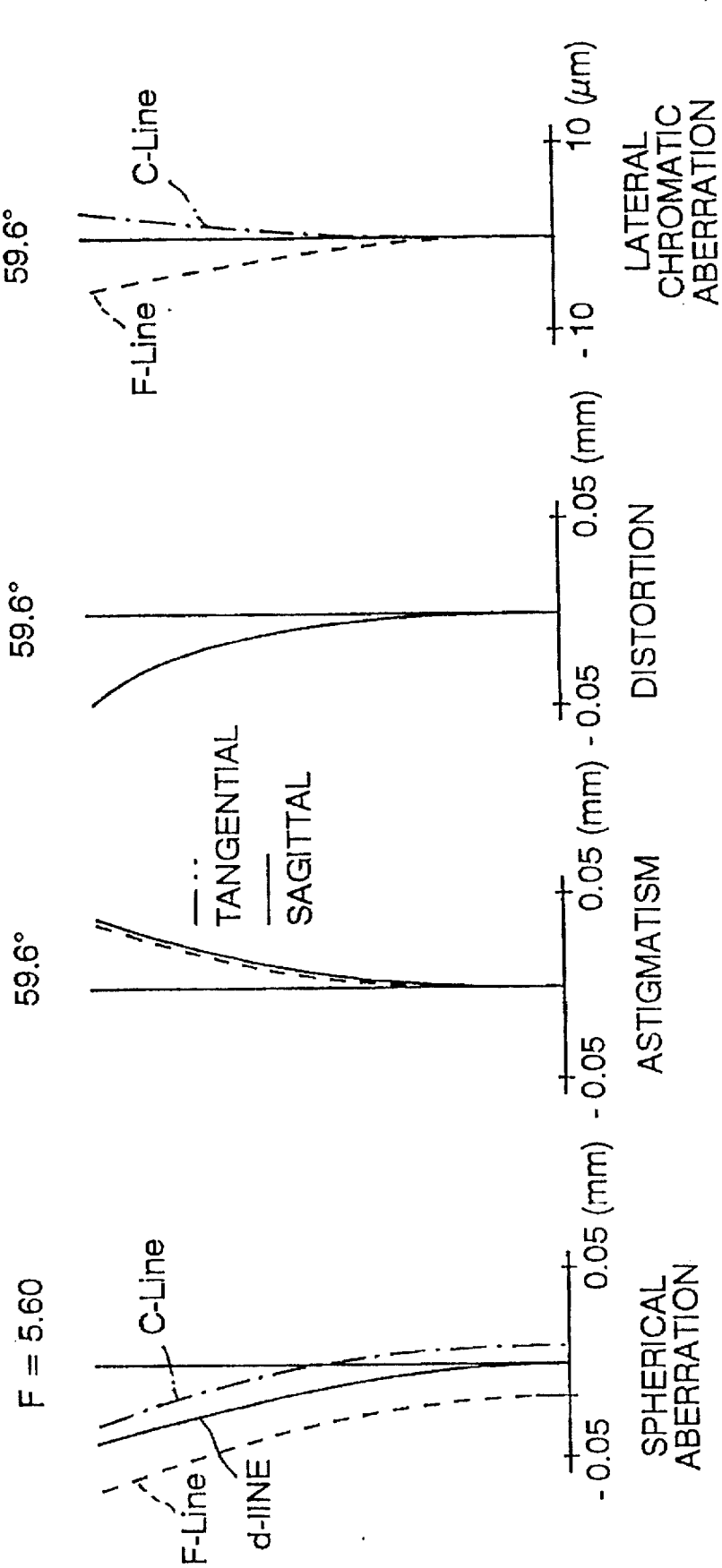

COMA

TANGENTIAL PLANE          SAGITTAL PLANE

59.6°

44.6°

32.2°

0°

OBJECTIVE LENS SYSTEM FOR ENDOSCOPE

BACKGROUND OF THE INVENTION

1. Field of the Invention

The present invention relates to an objective lens system for an endoscope, in particular to an electronic endoscope equipped with a solid-state imaging device.

2. Description of Related Art

While an endoscope having a flexible section formed as thin as possible is advantageous to be inserted into the interior of a human body, various restraints must be imposed on mechanical and optical configurations of an objective lens system. Specifically, the objective lens system installed at the distal end has a requirement that it must have a wide angle of view and produce a small size of image. Because of a short back focal length of the wide angle objective lens system, it is popular to bond an objective lens system to one end of an image guide fiber bundle such as described in Japanese Unexamined Patent Publication No. 2(1990)-176611.

In the endoscope described in the Japanese Unexamined Patent Publication No. 2(1990)-176611, having a solid-state imaging device installed in place of an image guide fiber bundle, because of a short back focal length of the conventional wide angle objective lens system, the solid-state imaging device must be disposed in close proximity to the objective lens system. Further, because of a flat configuration of the solid-state imaging device, it is essential to place the solid-state imaging device in parallel with a center line of the flexible section, which always results in an increase in diameter of the flexible section.

SUMMARY OF THE INVENTION

It is an object of the present invention to provide an objective lens for an endoscope which has a sufficient back focal distance and enables the endoscope to be made slender.

This object of the present invention is achieved by providing an objective lens system comprised of first to fifth optical elements, namely, in order from the subject end to the image end, a meniscus lens element of negative optical power having a concave image side surface, a plano-convex lens element of positive optical power having a convex image side surface, an aperture element, a plano-convex lens element of positive optical power having a convex image side surface, and a biconvex lens element of positive optical power. The objective lens system of the invention satisfies the following conditions:

$$Bf > 1.5f \quad \text{(I)}$$
$$1.80 < D/R2 < 2.40 \quad \text{(II)}$$
$$\mu_2 > 45.0 \quad \text{(III)}$$
$$\mu_3 > 50.0 \quad \text{(IV)}$$
$$\mu_4 > 50.0 \quad \text{(V)}$$

where Bf designates the back focal length of the objective lens system, f designates the overall focal length of the objective lens system, D designates the value of $d_{23}+(d_{34}/n_2)+d_{4S}$, where $d_{23}$, $d_{34}$ and $d_{4S}$ are the axial distance between the second and third lens surfaces, the third and fourth lens surfaces and the fourth lens surface and the image side surface of the aperture element, respectively, and $n_2$ is the index of refraction of the second lens element, R2 is the radius of curvature of the second lens surface, and $\mu_2$, $\mu_3$ and $\mu_4$ are the dispersion of the second, third and fourth lens elements as measured by the Abbe number, respectively.

The parameters set forth are necessary for suitably balancing the aberrations of the objective lens system. The satisfaction of these parameters ensures a thin flexible section of an endoscope having, in particular, a solid-state imaging device.

The first condition (I) defines the back focal length with distortion limited within a specified range. In order for the objective lens system to form an image on a solid-state imaging device disposed in parallel with a center line of a flexible section of the endoscope, the utilization is made of, for instance, a rectangular prism for turning the optical axis at a right angle. Accordingly, there must be an optical path length depending upon the size of an image area behind the objective lens system. This optical path length must be at least twice as long as the height of an image from the optical axis of the objective lens system. Because the ideal image height $y_0$ from the optical axis is expressed by f×tanθ, when the objective lens has an angle of view (2θ) of 90°, the ideal image height $y_0$ be equal to the overall focal length f of the objective lens system. The objective lens system for an endoscope, however, has large negative distortion (D%) which is generally given by 100% x(y−y_0)/y_0 (where y designates an actual image height from the optical axis) and is generally within a range between approximately −20% and −50%. Accordingly, the height y of an image having distortion within the range is between 0.5f and 0.8f. In making allowances for light beams and optical adjustment of the objective lens system, the back focal length (Bf) is conditioned to be greater than 1.5f.

The second condition (II) prevents or significantly reduce aggravation of the curvature of field and coma. In the objective lens system, which is of a retro-focus type having a simple optical structure, the angle of view depends on the optical power of the subject side foremost lens element and the distance of the aperture element from the foremost lens element. The optical power of the foremost lens element of the objective lens system of the invention is mostly provided by the image side concave surface. The angle of view, and hence the back focal length, becomes greater as the radius of curvature (R2) of the image side concave surface becomes smaller and as the distance of the aperture element from the foremost lens element becomes longer. If the limits of the condition (II) are exceeded, it is hard to make correction of the curvature of field and coma in a tangential direction.

The conditions (III) to (V) yields prevent or significantly reduce aggravation of lateral chromatic aberrations.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIGS. 2(A) to 2(D) are graphs showing characteristic curves of spherical aberrations for C-line, d-line and F-line, characteristic curves of astigmatism in sagittal and tangential image planes, a characteristic curve of distortion, and characteristic curves of lateral chromatic aberration for C-line and F-line, respectively;

FIG. 3 is graphs showing characteristic curves of coma at image heights from the optical axis of approximately 100%, 80% and 60% and on the optical axis in tangential and sagittal image planes for an F number of 5.60;

FIGS. 5(A) to 5(D) are graphs showing characteristic curves of spherical aberrations for C-line, d-line and F-line, characteristic curves of astigmatism in sagittal and tangential image planes, a characteristic curve of distortion, and characteristic curves of lateral chromatic aberration for C-line and F-line, respectively;

FIG. 6 is graphs showing characteristic curves of coma at image heights from the optical axis of approximately 100%, 80% and 60% and on the optical axis in tangential and sagittal image planes for an F number of 5.60;

FIG. 7 is a diagrammatic side view of an objective lens system for an endoscope in accordance with still another specific embodiment of the invention;

FIGS. 8(A) to 8(D) are graphs showing characteristic curves of spherical aberrations for C-line, d-line and F-line, characteristic curves of astigmatism in sagittal and tangential image planes, a characteristic curve of distortion, and characteristic curves of lateral chromatic aberration for C-line and F-line, respectively;

FIG. 9 is graphs showing characteristic curves of coma at image heights from the optical axis of approximately 100%, 80% and 60% and on the optical axis in tangential and sagittal image planes for an F number of 5.60;

FIGS. 11(A) to 11(D) are graphs showing characteristic curves of spherical aberrations for C-line, d-line and F-line, characteristic curves of astigmatism in sagittal and tangential image planes, a characteristic curve of distortion, and characteristic curves of lateral chromatic aberration for C-line and F-line, respectively;

DETAILED DESCRIPTION OF THE SPECIFIC EMBODIMENTS

An objective lens system embodying the invention as exemplified in FIGS. 1, 4, 7 and 10 is comprised, in order from the subject end to the image end, of a first meniscus lens element of negative optical power having a concave image side surface, a second plano-convex lens element of positive optical power having a convex image side surface, an aperture element, a third plano-convex lens element of positive optical power having a convex image side surface, a fourth biconvex lens element of positive optical power, and an aperture element disposed between the second and third lens elements.

The objective lens systems of all embodiments of the invention satisfies the following conditions:

$Bf > 1.5f$  (I)

$1.80 < D/R2 < 2.40$  (II)

$\mu_2 > 45.0$  (III)

$\mu_3 > 50.0$  (IV)

$\mu_4 > 50.0$  (V)

where Bf designates the back focal length of the objective lens system, f designates the overall focal length of the objective lens system, D designates the value of $d_{23}+(d_{34}/n_2)+d_{4S}$, where $d_{23}$, $d_{34}$ and $d_{4S}$ are the axial distance between the second and third lens surfaces, the third and fourth lens surfaces and the fourth lens surface and the image side surface of the aperture element, respectively, $n_2$ designates the index of refraction of the second lens element, R2 designates the radius of curvature of the second lens element, and $\mu_2$, $\mu_3$ and $\mu_4$ designate the dispersion as measured by the Abbe number of the second, third and fourth lens elements, respectively.

EXAMPLE I

Figure 1:
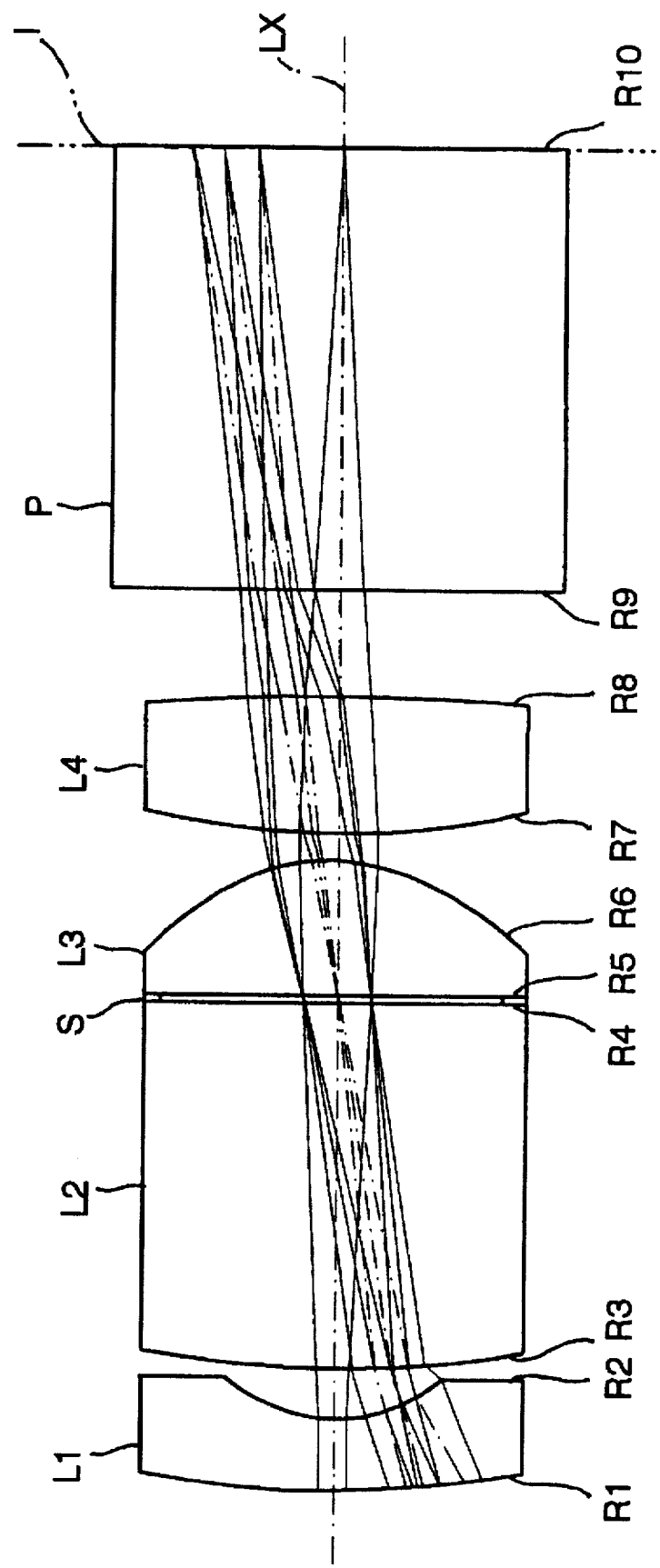
FIG. 1 is a diagrammatic side view of an objective lens system for an endoscope in accordance with a specific embodiment of the invention.

Referring to FIG. 1 showing an objective lens system OLS1 for an endoscope in accordance with an embodiment of the invention, the objective lens system OLS1 is comprised of, in order from the subject end to the image end, first to fourth optical elements L1–L4. The objective lens system OLS1 is further comprised of an aperture element S disposed between the second and third lens elements L2 and L3. On the image side of the objective lens system OLS1, there is disposed an optical element P, such as a rectangular prism, for turning the optical axis LX of the objective lens system OLS1 at a right angle. The first lens element L1 is a negative optical power meniscus lens having a convex subject side surface R1 and a concave image side surface R2. The second optical element L2 is a positive optical power plano-convex lens having a flat subject side surface R3 and a convex image side surface R4. The third optical element L3 is a positive optical power plano-convex lens having a flat subject side surface R5 and a convex image side surface R6. The fourth optical element L4 is a positive optical power biconvex lens having a convex subject side surface R7 and a convex image side surface R8. The rectangular prism P having flat subject side and image side surfaces R9 and R10 which practically intersect at a right angle is disposed on the image side of the fourth lens element L4 and turns the optical axis LX at a right angle. The aperture element S has a specified thickness substantially equal to an axial distance between the second and third lens elements L2 and L3 and is held by and between the second and third lens elements L2 and L3. Alternatively, the aperture element S may be formed as a light shield layer coated on an image side surface R6 of the third lens element L3. In FIG. 1, for the purpose of an easy understanding, the optical axis LX is depicted as a developed straight line. The flat surface R10 forms an image plane 1 to which a solid-state imaging element is adhered, or otherwise mechanically contacted.

The objective lens system OLS1 shown in FIG. 1 scaled to an overall focal length (f) of 0.5 mm, an image size of 0.7890 mm in diameter, a subject distance of 3.6698 mm and an angle of view of 91°16' is substantially described in Table I.

TABLE I

| Element | Radius of Curvature | Axial distance Between Surfaces | nd | vd |
|---|---|---|---|---|
| L1 | R1 = 2.8333 | | | |
| | | 0.2141 | 1.83500 | 42.6 |
| | R2 = 0.3576 | | | |
| | | 0.1224 | | |
| L2 | R3 = 2.8359 | | | |
| | | 0.9461 | 1.80518 | 25.4 |
| | R4 = ∞ | | | |

TABLE I-continued

| Element | Radius of Curvature | Axial distance Between Surfaces | nd | vd |
|---|---|---|---|---|
| S | | 0.0306 | | |
| | R5 = ∞ | | | |
| L3 | | 0.3670 | 1.69680 | 55.6 |
| | R6 = −0.6338 | | | |
| | | 0.0314 | | |
| | R7 = 2.3497 | | | |
| L4 | | 0.3670 | 1.69680 | 55.6 |
| | R8 = −6.5207 | | | |
| | | 0.3000 | | |
| | R9 = ∞ | | | |
| P | | 1.2000 | 1.55920 | 53.9 |
| | R10 = ∞ | | | |

Bf = 2.00 f
D/R2 = [0.1224 + (0.9461/1.80518) + 0.0306]/0.3576 = 1.893 where the reference L followed by an arabic numeral indicates the optical element progressively from the subject end to the image end of the lens system OLS1, nd is the index of refraction of the lens element in relation to d-line, and μd is the dispersion of the lens element as measured by the Abbe number. Further, the reference radius numbers R are the progressive surface radii. Positive surface radii are struck from the right of the lens surface on the optical axis LX. Negative surface radii are struck from the left of the lens surface on the optical axis LX.

As apparent from Table I, the objective lens system OLS1 shown in FIG. 1 satisfies the conditions (I)–(V).

FIGS. 2(A)–2(D) show various aberrations, namely spherical aberrations, astigmatism, distortion and lateral chromatic aberrations, respectively, of the objective lens system OLS1 depicted in FIG. 1. FIG. 3 shows coma of the objective lens system OLS1 depicted in FIG. 1 at image heights from the optical axis of approximately 60, 80 and 100% for an F number of 5.60.

EXAMPLE II

Figure 4:
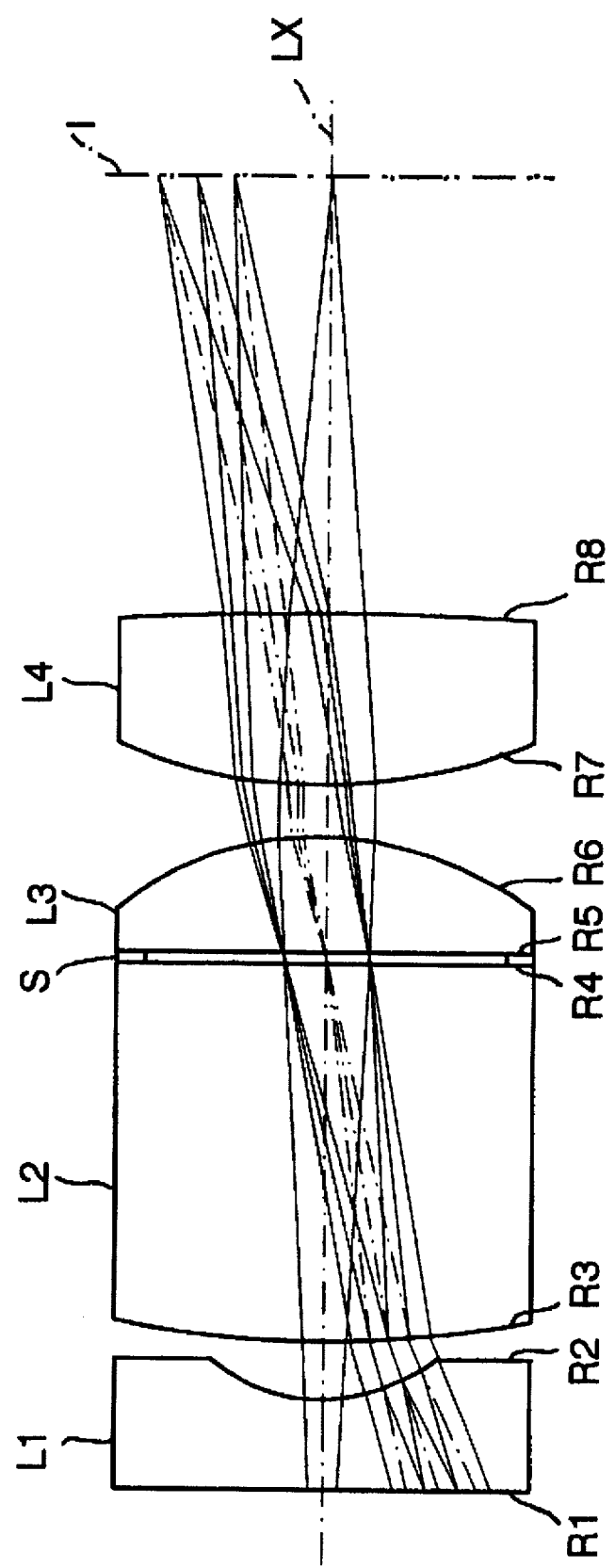
FIG. 4 is a diagrammatic side view of an objective lens system for an endoscope in accordance with another specific embodiment of the invention.

Referring to FIG. 4 showing an objective lens system OLS2 for an endoscope in accordance with another embodiment of the invention, the objective lens system OLS2 is comprised of, in order from the subject end to the image end, first to fourth optical elements L1–L4. Further, the objective lens system OLS2 has an aperture element S disposed between the second and third lens elements L2 and L3. The first optical element L1 is a negative optical power plano-convex lens having a flat subject side surface R1 and a concave image side surface R2. The second optical element L2 is a positive optical power plano-convex lens having a convex subject side surface R3 and a flat image side surface R4. The third optical element L3 is a positive optical power plano-convex lens having a flat subject side surface R5 and a convex image side surface R6. The fourth optical element L4 is a positive optical power biconvex lens having a convex subject side surface R7 and a convex image side surface R8. An image surface is designated I, where a solid-state imaging element is disposed. The aperture element S has a specified thickness substantially equal to an axial distance between the second and third lens elements L2 and L3 and is held by and between the second and third lens elements L2 and L3. Alternatively, the aperture element S may be formed as a light shield layer coated on an image side surface R6 of the third lens element L3.

The objective lens system OLS2 shown in FIG. 1 scaled to an overall focal length (f) of 0.5 mm, an image size of 0.91644 mm in diameter, a subject distance of 4.2625 mm and an angle of view of 117030, is substantially described in Table II.

TABLE II

| Element | Radius of Curvature | Axial distance Between Surfaces | nd | vd |
|---|---|---|---|---|
| | R1 = ∞ | | | |
| L1 | | 0.2486 | 1.83500 | 42.6 |
| | R2 = 0.3816 | | | |
| | | 0.1422 | | |
| | R3 = 3.3087 | | | |
| L2 | | 1.0044 | 1.80518 | 25.4 |
| | R4 = ∞ | | | |
| S | | 0.0355 | | |
| | R5 = ∞ | | | |
| L3 | | 0.4263 | 1.69680 | 55.6 |
| | R6 = −0.7028 | | | |
| | | 0.0711 | | |
| | R7 = 2.3647 | | | |
| L4 | | 0.4263 | 1.69680 | 55.6 |
| | R8 = −9.3143 | | | |

Bf = 2.360f
D/R2 = [0.1422 + (1.0044/1.80518) + 0.0355]/0.3816 = 1.924

As apparent from Table II, the objective lens system OLS2 shown in FIG. 4 satisfies the conditions (I)–(V).

FIGS. 5(A)–5(D) show various aberrations, namely spherical aberrations, astigmatism, distortion and lateral chromatic aberrations, respectively, of the objective lens system OLS2 depicted in FIG. 1. FIG. 6 shows coma of the objective lens system OLS2 depicted in FIG. 1 at image heights from the optical axis of 60, 80 and 100% for an F number of 5.60.

EXAMPLE III

Referring to FIG. 7 showing an objective lens system OLS3 for an endoscope in accordance with another embodiment of the invention, the objective lens system OLS3 is comprised of, in order from the subject end to the image end, first to fourth optical elements L1–L4. Further, the objective lens system OLS3 has an aperture element S disposed between the second and third lens elements L2 and L3. The first optical element L1 is a negative optical power meniscus lens having a convex subject side surface R1 and a concave image side surface R2. The second optical element L2 is a positive optical power plano-convex lens having a convex subject side surface R3 and a flat image side surface R4. The third optical element L3 is a positive optical power plano-convex lens having a flat subject side surface R5 and a convex image side surface R6. The fourth optical element L4 is a positive optical power biconvex lens having a convex subject side surface R7 and a convex image side surface R8. An image surface is designated I, where a solid-state imaging element is disposed. The aperture element S has a specified thickness substantially equal to an axial distance between the second and third lens elements L2 and L3 and is held by and between the second and third lens elements L2 and L3. Alternatively, the aperture element S may be formed as a light shield layer coated on an image side surface R6 of the third lens element L3.

The objective lens system OLS3 shown in FIG. 1 scaled to an overall focal length (f) of 0.5 mm, an image size of 0.76348 mm in diameter, a subject distance of 3.5528 mm and an angle of view of 90°54' is substantially described in Table III.

TABLE III

| Element | Radius of Curvature | Axial distance Between Surfaces | nd | vd |
|---|---|---|---|---|
| L1 | R1 = 11.9586 | 0.2072 | 1.88300 | 41.0 |
| | R2 = 0.3380 | 0.1189 | | |
| L2 | R3 = 4.1222 | 0.9816 | 1.80518 | 25.4 |
| S | R4 = ∞ | 0.0296 | | |
| L3 | R5 = ∞ | 0.3558 | 1.69680 | 55.6 |
| | R6 = −0.6681 | 0.0602 | | |
| L4 | R7 = 2.8365 | 0.3560 | 1.62041 | 60.3 |
| | R8 = −4.0220 | | | |

Bf = 2.660f
D/R2 =[0.1189 + (0.9816/1.80518) + 0.0296]/0.3380 = 2.048

As apparent from Table III, the objective lens system OLS2 sown in FIG. 7 satisfies the conditions (I)–(V).

FIGS. 8(A)–8(D) show various aberrations, namely spherical aberrations, astigmatism, distortion and lateral chromatic aberrations, respectively, of the objective lens system OLS2 depicted in FIG. 1. FIG. 9 shows coma of the objective lens system OLS3 depicted in FIG. 1 at image heights from the optical axis of 60, 80 and 100% for an F number of 5.60.

EXAMPLE IV

Figure 10:
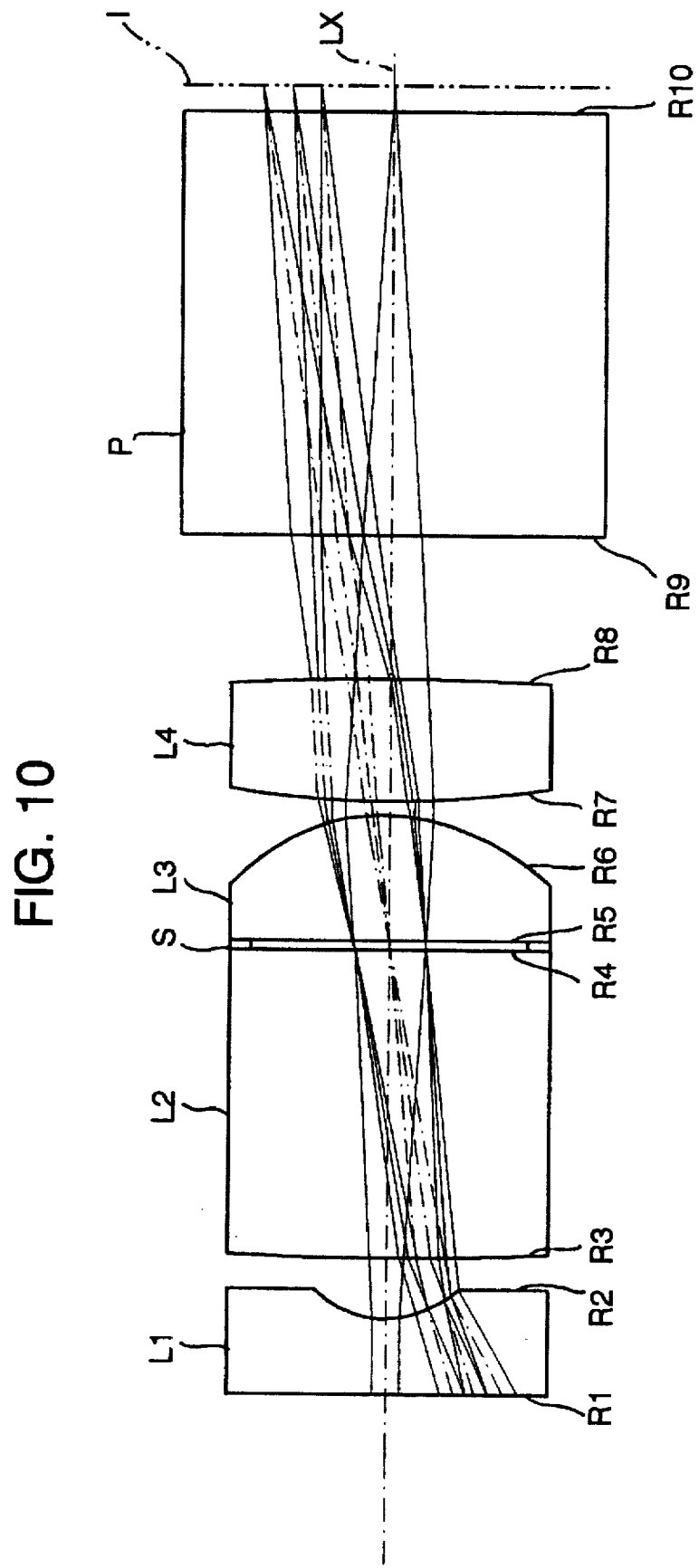
FIG. 10 is a diagrammatic side view of an objective lens system for an endoscope in accordance with a further specific embodiment of the invention.
Figure 12A:
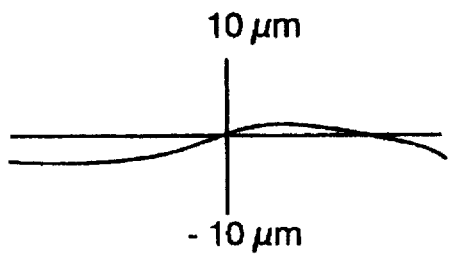
FIG. 12 is graphs showing characteristic curves of coma at image heights from the optical axis of approximately 100%, 80% and 60% and on the optical axis in tangential and sagittal image planes for an F number of 5.60.
Figure 12B:
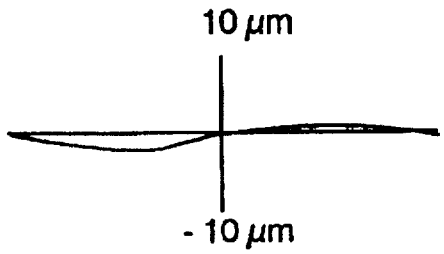
Figure 12C:
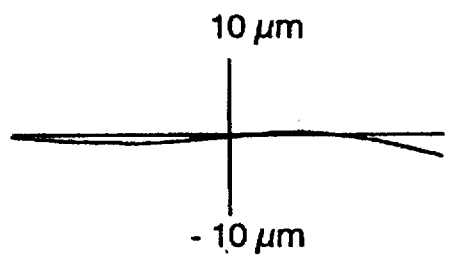
Figure 12D:
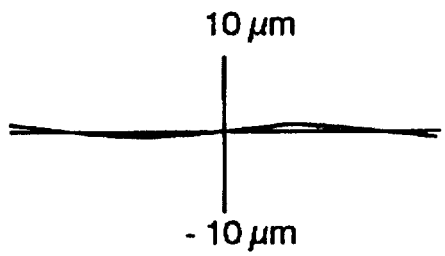
Figure 12E:
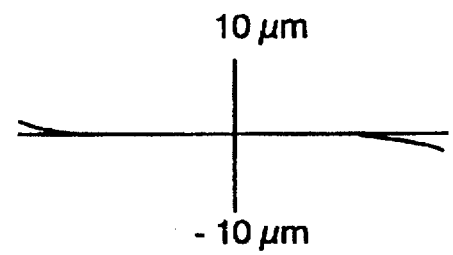
Figure 12F:
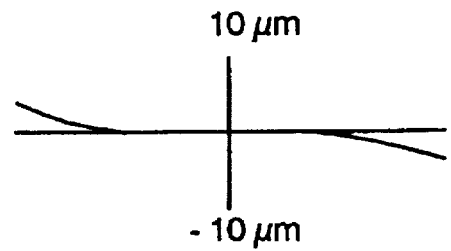
Figure 12G:
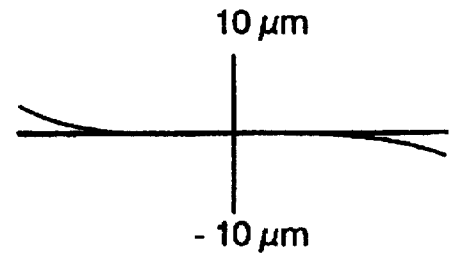

Referring to FIG. 10 showing an objective lens system OLS4 for an endoscope in accordance with an embodiment of the invention, the objective lens system OLS4 is comprised of, in order from the subject end to the image end, first to fourth optical elements L1–L4. The objective lens system OLS4 is further comprised of an aperture element S disposed between the second and third lens elements L2 and L3. On the image side of the objective lens system OLS4, there is disposed an optical element P, such as a rectangular prism, for turning the optical axis LX of the objective lens system OLS4 at a right angle. The first optical element L1 is a negative optical power meniscus lens having a convex subject side surface R1 and a concave image side surface R2. The second optical element L2 is a positive optical power plano-convex lens having a convex subject side surface R3 and a flat image side surface R4. The third optical element L3 is a positive optical power plano-convex lens having a flat subject side surface R5 and a convex image side surface R6. The fourth optical element L4 is a positive optical power biconvex lens having a convex subject side surface R7 and a convex image side surface R8. The rectangular prism P having flat subject side and image side surfaces R9 and R10 practically intersecting at a right angle is disposed on the image side of the fourth lens element L4 and turns the optical axis LX at a right angle. In FIG. 10, for the purpose of an easy understanding, the optical axis LX is depicted as a developed straight line. An image plane I is behind the flat surface R10 of the rectangular prism P, where a solid-state imaging element is located. The aperture element S has a specified thickness substantially equal to an axial distance between the second and third lens elements L2 and L3 and is held by and between the second and third lens elements L2 and L3. Alternatively, the aperture element S may be formed as a light shield layer coated on an image side surface R6 of the third lens element L3.

The objective lens system OLS4 shown in FIG. 10 scaled to an overall focal length (f) of 0.5 mm, an image size of 0.92188 mm in diameter, a subject distance of 4.2878 mm and an angle of view of 119°14' is substantially described in Table IV.

TABLE IV

| Element | Radius of Curvature | Axial distance Between Surfaces | nd | vd |
|---|---|---|---|---|
| L1 | R1 = 19.2005 | 0.2501 | 1.88300 | 41.0 |
| | R2 = 0.3785 | 0.2302 | | |
| L2 | R3 = 111.4488 | 1.0768 | 1.80518 | 25.4 |
| S | R4 = ∞ | 0.0357 | | |
| L3 | R5 = ∞ | 0.4623 | 1.69680 | 55.6 |
| | R6 = −0.7769 | 0.0948 | | |
| L4 | R7 = 3.2396 | 0.4535 | 1.69680 | 55.6 |
| | R8 = −6.6209 | 0.5000 | | |
| P | R9 = ∞ | 1.5000 | 1.55920 | 53.9 |
| | R10 = ∞ | | | |

Bf = 3.030f
D/R2 = [0.2300 + (1.0768/1.80518) + 0.0357]/0.3785 = 2.278

As apparent from Table IV, the objective lens system OLS4 shown in FIG. 10 satisfies the conditions (I)–(V).

FIGS. 11(A)–11(D) show various aberrations, namely spherical aberrations, astigmatism, distortion and lateral chromatic aberrations, respectively, of the objective lens system OLS4 depicted in FIG. 10. FIG. 12 shows coma of the objective lens system OLS4 depicted in FIG. 10 at image heights from the optical axis of 60, 80 and 100% for an F number of 5.60. The significant optical characteristic of the objective lens system for an endoscope of the invention is made clear in comparison with a comparative prior art objective lens system OLS which is taught by the Japanese Unexamined Patent Publication No. 2(1990)-176611 and shown in FIG. 13.

The prior art objective lens system OLS for an endoscope described in the Japanese Unexamined Patent Publication No. 2(1990)-176611 is comprised, in order from the subject end to the image end, of a first meniscus lens element L1 of negative optical power having a concave image side surface R2, a second meniscus lens element L2 of negative optical power having a concave image side surface R4, a third meniscus lens element L3 of negative optical power having a concave subject side surface R5, a fourth plano-convex lens element L4 of positive optical power having a convex subject side surface R7. An aperture element S is disposed between the second and third lens elements L2 and L3. The flat surface R8 of the fourth lens element L4 forms an image plane I to which a solid-state imaging element or an image guide fiber bundle at its light entrance end is adhered, or otherwise mechanically contacted.

Figure 13:
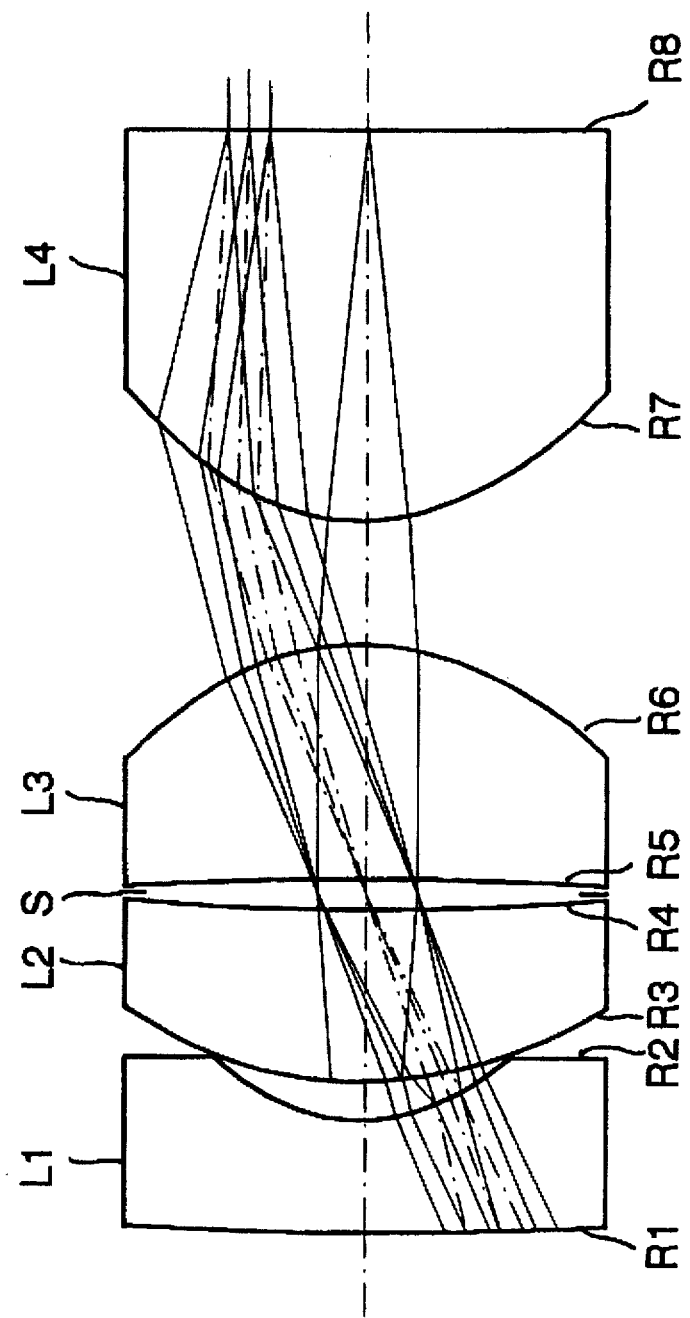
FIG. 13 is a diagrammatic side view of a prior art objective lens system for an endoscope.

The objective lens system OLS shown in FIG. 13 scaled to an overall focal length (f) of 0.5 mm, an image size of 0.65381 mm in diameter, a subject distance of 6.0 mm and an angle of view of 90°07' is substantially described in Table V.

TABLE V

| Element | Radius of Curvature | Axial distance Between Surfaces | nd | vd |
|---|---|---|---|---|
| L1 | R1 = 7.505 | | | |
| | | 0.296 | 1.72916 | 54.8 |
| | R2 = 0.548 | | | |
| | | 0.099 | | |
| | R3 = 0.921 | | | |
| L2 | | 0.494 | 1.66755 | 41.9 |
| | R4 = 11.727 | | | |
| | | 0.033 | | |
| S | — | | | |
| | | 0.033 | | |
| | R5 = ∞ | | | |
| L3 | | 0.657 | 1.72916 | 54.8 |
| | R6 = −11.727 | | | |
| | | 0.281 | | |
| | R7 = 3.2396 | | | |
| L4 | | 1.016 | 1.60738 | 56.7 |
| | R8 = ∞ | | | |

Bf = 0.000f
D/R2 = [0.099 + (0.494/1.66755) + 0.033]/0.548 = 0.781 where the reference L followed by an arabic numeral indicates the optical element progressively from the subject end to the image end of the lens system OLS, nd is the index of refraction of the lens element in relation to d-line, and μd is the dispersion of the lens element as measured by the Abbe number. Further, the reference radius numbers R are the progressive surface radii. Positive surface radii are struck from the right of the lens surface on the optical axis LX. Negative surface radii are struck from the left of the lens surface on the optical axis LX.

In Table V, the thickness of the aperture element S is theoretically taken as zero (0).

As apparent from the foregoing description, the objective lens system of each of the embodiments of the invention provides a sufficiently long back focal length and, consequently, enable to form a space behind the forth lens element in which a rectangular prism for turning the optical axis at a right angle is disposed. This results in enabling an solid-state imaging device with its imaging surface placed in parallel with a lengthwise center line of the flexible section of an endoscope which is essential to form the flexible section as thin as possible.

It may thus be seen that the objects of the invention set forth as well as those made apparent from the foregoing description are efficiently attained. Embodiments of the invention have been set forth for purposes of disclosure, however, modifications to the disclosed embodiments of the invention as well as other embodiments thereof may occur to those skilled in the art. Accordingly, the appended claims are intended to cover all embodiments of the invention and modifications which do not depart from the spirit and scope of the invention.

What is claimed is:

1. An objective lens system for an endoscope comprising from the subject end to the image end a meniscus lens element of negative optical power having a concave image side surface, a plano-convex lens element of positive optical power having a convex subject side surface, an aperture element, a plano-convex lens element of positive optical power having a convex image side surface and a biconvex lens element of positive optical power, said objective lens systems satisfying the following relations:

Bf'>1.5f'
1.80<D/R2<2.40
μ$_2$>45.0
μ$_3$>50.0
μ$_4$>50.0 where Bf' designates the back focal length of the objective lens system, f' designates the overall focal length of the objective lens system, D designates the value of d$_{23}$+(d$_{34}$/n$_2$)+d$_{4S}$, where d$_{23}$, d$_{34}$ and d$_{4S}$ are the axial distance between the second and third lens surfaces, the third and fourth lens surfaces and the fourth lens surface and the image side surface of the aperture element, respectively, and n$_2$ is the index of refraction of the second lens element, R2 is the radius of curvature of the second lens surface, and μ$_2$, μ$_3$ and μ$_4$ are the dispersion of the second, third and fourth lens elements as measured by the Abbe number, respectively.

2. An objective lens system as defined in claim 1, and further comprising a rectangular prism disposed behind the fourth lens element.

3. An objective lens system as defined in claim 1, wherein said aperture element is formed as a light shield layer coated on a subject side surface of the third lens element.

4. An objective lens system as defined in claim 1 substantially as described:

| Element | Radius of Curvature | Axial distance Between Surfaces | nd | vd |
|---|---|---|---|---|
| L1 | R1 = 2.8333 | | | |
| | | 0.2141 | 1.83500 | 42.6 |
| | R2 = 0.3576 | | | |
| | | 0.1224 | | |
| | R3 = 2.8359 | | | |
| L2 | | 0.9461 | 1.80518 | 25.4 |
| | R4 = ∞ | | | |
| S | | 0.0306 | | |
| | R5 = ∞ | | | |
| L3 | | 0.3670 | 1.69680 | 55.6 |
| | R6 = −0.6338 | | | |
| | | 0.0314 | | |
| | R7 = 2.3497 | | | |
| L4 | | 0.3670 | 1.69680 | 55.6 |
| | R8 = −6.5207 | | | | where the objective lens system comprises lens elements L1 to L4 having surfaces R1 to R8 and an aperture element S, the index of refraction in relation to d-line is given by nd, the dispersion μd is measured by the Abbe number.

5. An objective lens system as defined in claim 4, and further comprising a rectangular prism disposed at a distance of 1.2 mm behind the fourth lens element from the fourth lens element.

6. An objective lens system as defined in claim 5, wherein said rectangular prism has an axial distance of 1.2 mm between surfaces intersecting at a right angle, the index of refraction of 1.55920 and a dispersion of 53.9 as measured by the Abbe number.

7. An objective lens system as defined in claim 4, wherein said aperture element is formed as a light shielding layer coated on a subject side surface of the third lens element.

8. An objective lens system as defined in claim 1 substantially as described:

| Element | Radius of Curvature | Axial distance Between Surfaces | nd | vd |
|---|---|---|---|---|
| L1 | R1 = ∞ | 0.2486 | 1.83500 | 42.6 |
|  | R2 = 0.3816 | 0.1422 |  |  |
| L2 | R3 = 3.3087 | 1.0044 | 1.80518 | 25.4 |
|  | R4 = ∞ | 0.0355 |  |  |
| S | R5 = ∞ |  |  |  |
| L3 |  | 0.4263 | 1.69680 | 55.6 |
|  | R6 = −0.7028 | 0.0711 |  |  |
| L4 | R7 = 2.3647 | 0.4263 | 1.69680 | 55.6 |
|  | R8 = −9.3143 |  |  |  | where the objective lens system comprises lens elements L1 to L4 having surfaces R1 to R8 and an aperture element S, the index of refraction in relation to d-line is given by nd, the dispersion μd is measured by the Abbe number.

9. An objective lens system as defined in claim 8, and further comprising a rectangular prism disposed behind the fourth lens element.

10. An objective lens system as defined in claim 8, wherein said aperture element is formed as a light shielding layer coated on a subject side surface of the third lens element.

11. An objective lens system as defined in claim 1 substantially as described:

| Element | Radius of Curvature | Axial distance Between Surfaces | nd | vd |
|---|---|---|---|---|
| L1 | R1 = 11.9586 | 0.2072 | 1.88300 | 41.0 |
|  | R2 = 0.3380 | 0.1189 |  |  |
| L2 | R3 = 4.1222 | 0.9816 | 1.80518 | 25.4 |
|  | R4 = ∞ | 0.0296 |  |  |
| S | R5 = ∞ |  |  |  |
| L3 |  | 0.3558 | 1.69680 | 55.6 |
|  | R6 = −0.6681 | 0.0602 |  |  |
| L4 | R7 = 2.8365 | 0.3560 | 1.62041 | 60.3 |
|  | R8 = −4.0220 |  |  |  | where the objective lens system comprises lens elements L1 to L4 having surfaces R1 to R8 and an aperture element S, the index of refraction in relation to d-line is given by nd, the dispersion μd is measured by the Abbe number.

12. An objective lens system as defined in claim 11, and further comprising a rectangular prism disposed behind the fourth lens element.

13. An objective lens system as defined in claim 11, wherein said aperture element is formed as a light shielding layer coated on a subject side surface of the third lens element.

14. An objective lens system as defined in claim 1 substantially as described:

| Element | Radius of Curvature | Axial distance Between Surfaces | nd | vd |
|---|---|---|---|---|
| L1 | R1 = 19.2005 | 0.2501 | 1.88300 | 41.0 |
|  | R2 = 0.3785 | 0.2302 |  |  |
| L2 | R3 = 111.4488 | 1.0768 | 1.80518 | 25.4 |
|  | R4 = ∞ |  |  |  |
| S | R5 = ∞ | 0.0357 |  |  |
| L3 |  | 0.4623 | 1.69680 | 55.6 |
|  | R6 = −0.7769 | 0.0948 |  |  |
| L4 | R7 = 3.2396 | 0.4535 | 1.69680 | 55.6 |
|  | R8 = −6.6209 |  |  |  | where the objective lens system comprises lens elements L1 to L4 having surfaces R1 to R8 and an aperture element S, the index of refraction in relation to d-line is given by nd, the dispersion μd is measured by the Abbe number.

15. An objective lens system as defined in claim 14, and further comprising a rectangular prism disposed at a distance of 0.5 mm behind the fourth lens element from the fourth lens element.

16. An objective lens system as defined in claim 15, wherein said rectangular prism has an axial distance of 1.5 mm between surfaces intersecting at a right angle, the index of refraction of 1.55920 and a dispersion of 53.9 as measured by the Abbe number.

17. An objective lens system as defined in claim 14, wherein said aperture element is formed as a light shielding layer coated on a subject side surface of the third lens element.

* * * * *